Oct. 5, 1926. 1,602,074
F. HENKE
SAFETY DEVICE FOR CONTROLLING THE BREAKING OF ELECTRIC
CIRCUITS OF IGNITION SYSTEMS
Filed July 26, 1924 3 Sheets-Sheet 1
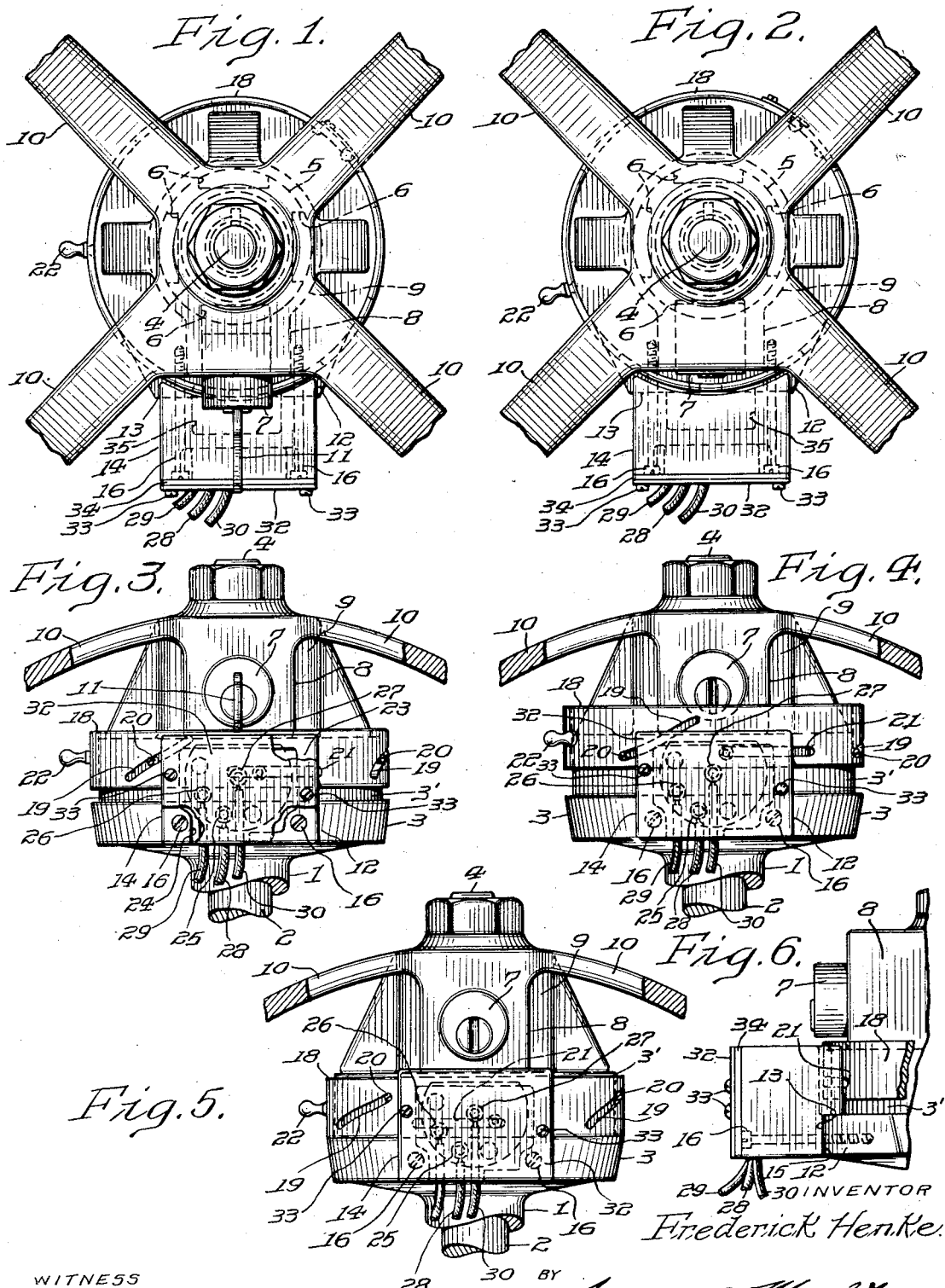
WITNESS
INVENTOR
Frederick Henke.
BY Anderson & Moulton
ATTORNEYS

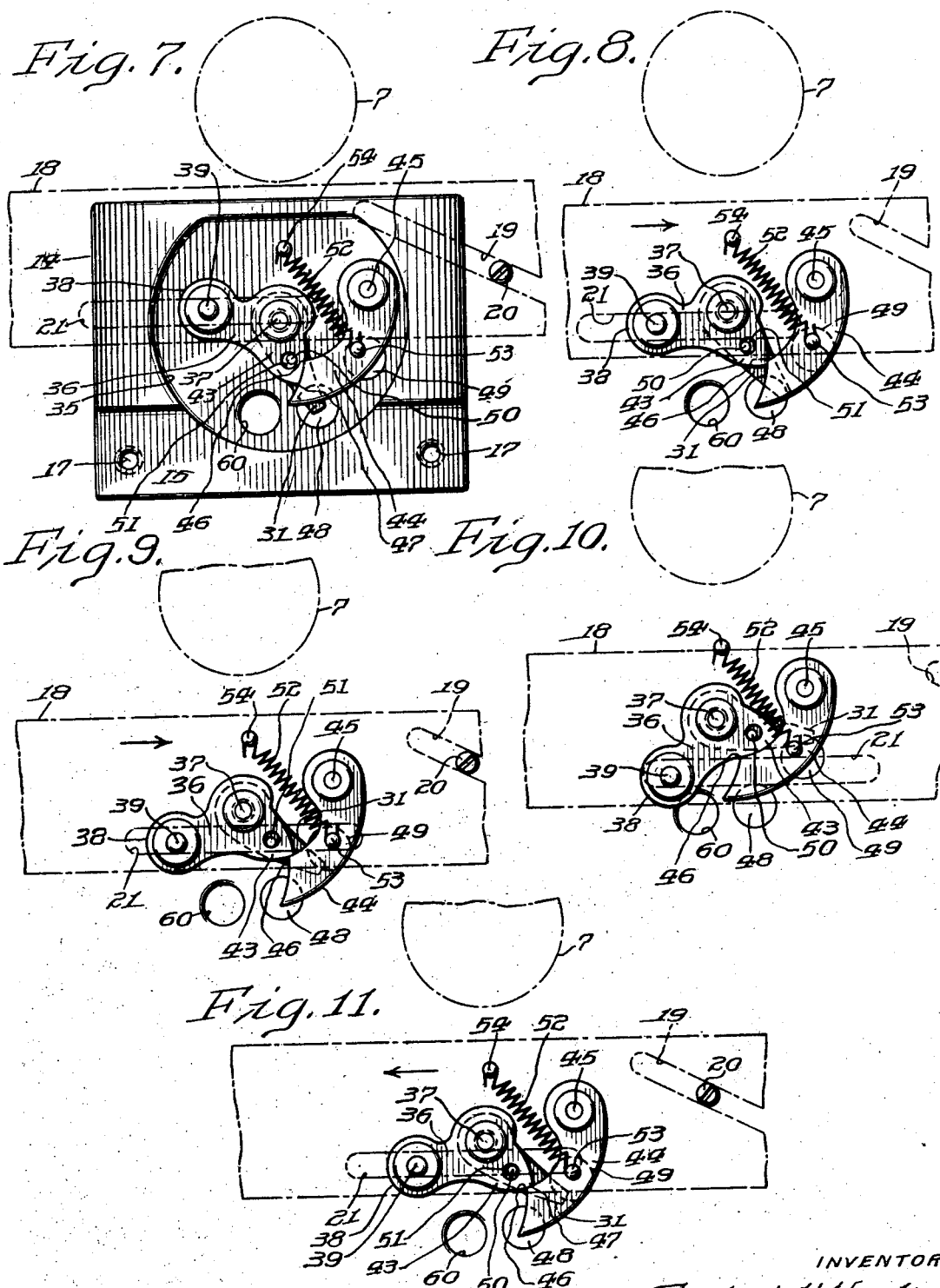

Oct. 5, 1926.
1,602,074
F. HENKE
SAFETY DEVICE FOR CONTROLLING THE BREAKING OF ELECTRIC
CIRCUITS OF IGNITION SYSTEMS
Filed July 26, 1924     3 Sheets—Sheet 3
Fig. 12.
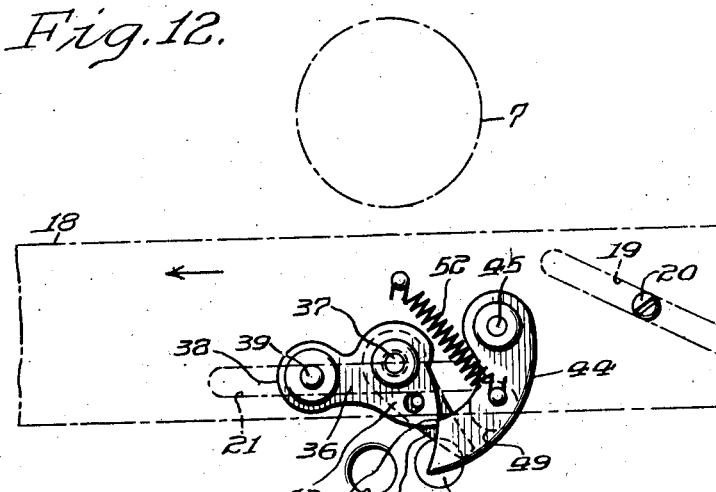
Fig. 13.
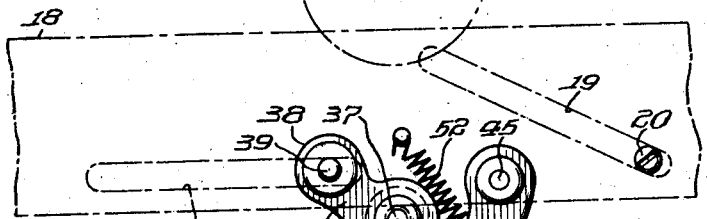
Fig. 14.
Fig. 15.
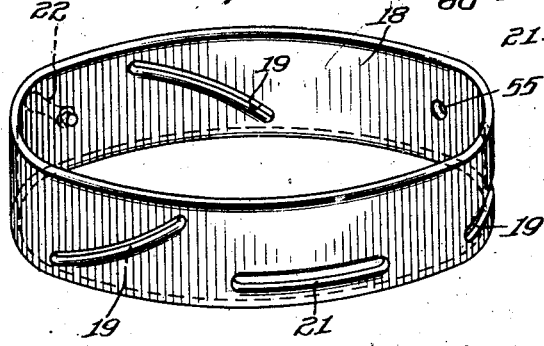
Fig. 16.
Fig. 17.
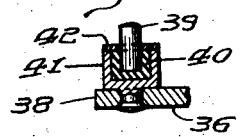
INVENTOR
Frederick Henke.
WITNESS
F. J. Hartman
BY
Anderson & Moulton
ATTORNEYS Patented Oct. 5, 1926.

1,602,074

UNITED STATES PATENT OFFICE.

FREDERICK HENKE, OF PHILADELPHIA, PENNSYLVANIA, ASSIGNOR TO FOX AUTOMOTIVE PRODUCTS CORPORATION, A CORPORATION OF DELAWARE.

SAFETY DEVICE FOR CONTROLLING THE BREAKING OF ELECTRIC CIRCUITS OF IGNITION SYSTEMS.

Application filed July 26, 1924. Serial No. 728,345.

Heretofore it has been common practice to lock the steering wheels of automobiles in two ways, namely, by (1) mechanisms in which the locking bolt or barrel is mounted in or rigid with the stationary steering post and is movable into and out of a recess in a suitable member rigid with and movable with the steering wheel and (2) in which the lock, bolt or barrel is carried by the steering wheel or is connected with the steering wheel to move therewith, and is movable into and out of a recess in a coacting member stationary with respect to the steering wheel preferably connected to or mounted within the steering column or casing.

The present invention relates to a device which may be used with either of the above-mentioned types of locks, although it is particularly designed and adapted for use in connection with the second type of lock above referred to.

The object of my invention is to provide a device which will indicate by the running or non-running of the engine whether the steering wheel is locked.

A further object of my invention is to provide the ignition circuits of an automobile or a similar device with a switch which can only be operated to break the ignition circuit or circuits when the car is locked and which will maintain the running or ignition circuit or circuits closed, so long as the car is unlocked, so that the engine, having once been started, cannot be stopped, until the car is locked.

A further object of my invention is to prevent an operator of a motor car from breaking the ignition circuit or circuits, to stop the operation of the engine, without first locking the car.

A further object of my invention is to provide a device which will indicate that the car is in an unlocked condition by reason of the fact that the engine, having once been started, is still running.

A further object of my invention is to provide a safety device which will cooperate with a locking bolt of a steering wheel lock whether the bolt rotates with the steering wheel or is stationary with respect thereto.

A further object of my invention is to make it mandatory upon an operator of a motor car to lock the car in order to break the ignition circuit or circuits.

A further object of my invention is to provide a switch stationarily positioned with respect to the steering wheel the operation of which is controlled by the locking bolt of a steering wheel lock, even though said bolt may move with respect to said switch and may be locked in any one of a plurality of different positions with respect to said switch.

A further object of my invention is to provide a small, simple, unobtrusive device which will not interfere with the free movement of the steering wheel nor be in the way of any of the other mechanisms with which an automobile is usually equipped.

Further objects of my invention will appear in the specification and claims below.

In the drawings forming a part of this specification and in which the same reference characters are employed throughout the various views to designate the same parts, I have illustrated one embodiment of my invention as applied to and cooperating with a steering wheel locking an automoble wherein the locking bolt is mounted in and moves with the steering wheel.

Fig. 1 is a top plan view of my invention applied to the top of the steering gear casing or steering post or column, the hub and the spokes of the steering wheel, with the locking barrel mounted therein, being shown, the steering wheel being in unlocked condition.

Fig. 2 is a view similar to Fig. 1 but with the wheel locked with respect to the steering post.

Fig. 3 is a side elevational view of the construction shown in Fig. 1.

Fig. 4 is a side elevational view of the construction shown in Fig. 2.

Fig. 5 shows the parts in the positions in which they preferably are in starting the engine.

Fig. 6 is a fragmentary side elevational view of Fig. 3.

Fig. 7 is a rear elevational view of the switch in which the parts are preferably in the positions assumed when the engine is normally running on the magneto circuit.

Fig. 8 is a diagrammatic view of the operative parts of the switch just prior to the throwing of the switch from the magneto contact point to the battery contact point.

Fig. 9 is a view of the next position of the switch elements; that is to say, just after the switch has jumped to break the magneto circuit and to close the battery circuit.

Fig. 10 shows the limit of the movement of the switch in the one direction and that position is preferable with the battery circuit closed, as in starting.

Fig. 11 is a view somewhat similar to Fig. 7 showing the switch elements in the positions about to break a battery circuit and closing the magneto circuit.

Fig. 12 shows the position of the parts at the instant of closing the magneto circuit and Fig. 13 shows the parts at the limits of their movements in the opposite direction to that shown in Fig. 11 and with both circuits broken.

Fig. 14 is a perspective view of the controller ring by the movement of which the switch is thrown and which co-operating with the barrel of the lock is operative to prevent the breaking of the ignition circuits so long as the car is in unlocked condition.

Fig. 15 is a side elevational view of the top of the steering column and a fragmentary view of the controller ring showing the ring in its uppermost position in which the ignition circuit or circuits are broken.

Fig. 16 is a fragmentary view of a positioning device carried by the controller ring whereby the ring may be held in normal running position without liability of accidental movement therefrom due, for instance, to the vibration of the engine. In Figs. 15 and 16 two of the positions in which the ring may be thus held are shown.

Fig. 17 is a sectional view of a detail.

Within the steering gear tubing or column 1 of an automobile is mounted the steering shaft or post 2 and at the top of the column 1 is secured a suitable casing 3 in which are housed the gearing (not shown) between the steering wheel shaft 4 and the steering shaft 2. The gearing is of usual and ordinary construction, such as is found in a Ford automobile, and a further description thereof is not deemed necessary. Also within the casing 3 which is fixed and stationary with respect to the steering column or casing 1, is a lock-bolt-receiving member 5 rigidly fastened to the column 1 or casing 3 and having a plurality of recesses or sockets 6 into any one of which the inner end of the locking bolt or barrel 7 is inserted to lock the steering wheel and out of which the said bolt is withdrawn to unlock the wheel. The locking barrel 7 is preferably mounted in a lug or projection 8 on the hub 9 of the steering wheel 10. The upper end 3' of the casing is preferably cylindrical and is concentric with the axis of the steering wheel.

The lock proper, which comprises the bolt receiving member 5 and the locking barrel 7 may be of usual construction and I preferably so arrange it so that when the barrel 7 is pushed into the hub 9 with its inner end seated in one of the recesses or sockets 6, the outer end is flush with the outer side of the lug 8 and well below or within the plane of the cylindrical surface 3' of the hub 9 and when the barrel 7 is pulled outwardly to disengage the inner end thereof from a recess or socket 6, the outer end of the barrel projects well beyond said cylindrical surface. These locks are usually and preferably arranged so that the key 11 may not be withdrawn except when the barrel 7 is in the locked or in the unlocked position. The top of the steering gear tubing or column 1 is preferably provided with a spot or projection 12 having a substantially flat vertical surface 13 to which may be attached the housing 14 of an electric switch mechanism.

The switch housing 14 is preferably provided on its inner or rear side, with a flat surface 15 adapted to fit squarely against the flat surface 13 of the projection 12 and to be secured thereto by screws 16 passing through holes 17 in the housing and threaded into the boss or projection 12. Fitting around the cylindrical surface 3' of the casing 3 is a controller ring 18 provided with a series of inclined slots 19 therethrough in which fit the studs or screws 20 rigidly threaded into the cylindrical surface 3' of the casing 3. The ring is also preferably provided with a horizontal slot 21 into which the operating lever of the switch, to be later described, is loosely fitted. The ring 18 is also preferably provided with a handle 22 by means of which the ring may be given a rotative movement about the axis of the steering post 2. When the handle 22 is moved to rotate the ring in one direction, the ring also rises, due to the engagement of the studs 20 with the inclined slots 19, and when it is turned in the opposite direction, the ring also falls or moves downwardly for the same reason.

The front side of the switch housing or block 14 is preferably provided with a marginal ridge or wall 23 preferably continuous except at the under or lower side thereof where it may be interrupted to provide a passage 24 for the wires of the electric circuits. The screws 16 preferably pass through this thickened portion of the casing in order to provide rigidity to the connection of the mounting of the housing upon the casing 3. On the front side of the block or housing 14 and within the marginal wall or ridge 23 are three binding posts 25, 26, 27, to which are respectively connected the wires 28, 29, 30 of the electric circuits. The binding post 25 is preferably connected by wire 28 to the magneto and is therefore in the magneto ignition circuit. The binding post 26 is preferably connected by wire 29 to the battery and is therefore in the battery or starting circuit and the binding post 27, which is electrically connected with the movable contact 31 of the switch, is preferably grounded to the machine by wire 30.

The block or housing 14 is preferably molded and is of some insulating material, such as bakelite and the front side thereof is preferably closed with a metal cover 32 which may rest upon the top or outer surface of the marginal wall or ridge 23 and is secured thereto by screws 33. Preferably, however, a sheet 34 of insulating material is interposed between the metal cover 23 and the housing 14 so that there may be no accidental contact between any of the binding posts 25, 26, 27 with the metal cover 32, with a consequent short circuit of the switch.

The inner surface of the block or housing 14 above the flat surface 15 thereof is preferably cylindrically concave to lie close to but out of contact with the outer surface of the controller ring 18. In a recess 35 in the rear of the block or housing 14 are mounted the circuit making and breaking elements of the switch and the mechanism for operating the same. The main or operating lever 36 is pivotally mounted to turn on a pin 37 electrically connected to the binding post 27 and is provided with a radially extending arm 38 provided, near the outer end thereof, with a metal pin 39 adapted, when the device is properly assembled, to enter and loosely fit between the upper and lower walls of the horizontal slot 21 of the controller ring 18. There is preferably considerable backlash between the pin 39 and the slot 21 as will be again referred to below. This pin 39 should be carefully insulated from the main or operating lever 36. Thus, the pin 39 may be rigidly seated in a core 40 of insulating material encased in the hollow cylindrical end of a stud 41 which in turn is riveted or otherwise rigidly secured to the end of the lever 36, and an insulating washer 42 is preferably interposed between the pin 39 and the end of the stud 41, said washer being of a diameter to fully and completely cover the metallic end of the stud 41. It will thus be seen that although the pin 39 may be of metal and may enter the slot 21 of the metal ring 18, there can be no electrical communication between the lever 36 and the ring 18.

The operating lever 36 is also provided with a heart-shape cam 43 for cooperation with a lever 44 pivoted on a pivot pin 45 secured to the block or housing 14 in the bottom of the recess 35. This lever 44 is preferably provided with a relatively sharp edge 46 over which the pointed end 47 of the heart-shaped cam 43 must pass in swinging the arm 31 from one circuit closing position to another, in its swing about the pivot pin 37.

Also pivotally mounted to rotate on the pin 37 is the movable contact arm 31, the outer end of which is adapted to successively engage the stationary contact points 48 and 49 respectively connected to the binding posts 25 and 26. The movable contact point or arm 31 is preferably provided with a pin 50 which loosely fits into an opening 51 in the heart-shaped cam 43 so that there is a limited amount of backlash or relative motion between the heart-shaped cam and the movable contact point 31. The lever 44 is preferably held against the heart-shaped cam 43 by a spring 52, one end of which is attached to said lever by a stud or pin 53 and the other end of which is connected to a stud or pin extending from the bottom of the recess 35.

Having now described with particularity the construction of the mechanism which embodies my invention the operation thereof is as follows, referring particularly to Figs. 6 to 12 inclusive:

In Figs. 1, 3, 6 and 7 the parts are in what will be termed normal running position, and where the ignition circuits of an automobile include a battery circuit for starting the motor, and a magneto ignition circuit for normal running conditions, the stationary contact point 48 will preferably be in the magneto ignition circuit, this circuit being closed through the wire 28, binding post 25, stationary contact point 48, movable contact point 31 to pin 37, binding post 27, wire 30 to ground. In this position the locking barrel 17 will be withdrawn to its outermost position as shown in Figs. 1, 3 and 6 so that the barrel 7 is above and is in the path of the full vertical movement of the controller ring 18. The handle 22 (see Fig. 1) may now not be moved further in an anticlockwise direction because such a movement slightly lifting the ring 18, would bring it immediately into engagement with the underside of the barrel 7. In other words the barrel 7 projecting into the path of the vertical movement of the controller ring 18 prevents the ring from being lifted higher than the position shown in Fig. 7. The running circuit may not, therefore, be broken so long as the barrel 7 is out of a socket or recess 6. While the barrel is in this position, the operator may move the handle 22 in a clockwise direction and Figs. 8, 9 and 10 show how the switch mechanism operates when the handle 22, and the controller ring 18 rigid therewith, are so moved. As the ring 18 is thus rotated from the position shown in Fig. 7 to that shown in Fig. 8, it also moves downwardly, due to the engagement of the stationary studs 20 with the inclined slots 19, and the point 47 of the heart-shaped cam 43 approaches the sharp edge 46 of the lever 44 forcing the lever 44 outwardly in an anticlockwise direction about its pivot pin 45 and against the tension of the spring 53. Because the movable contact arm 31 is moved by the engagement of the pin 50 with the wall of the hole or opening 51 in the heart-shaped cam and because the hole is of considerably larger diameter than the diameter of the pin 50, the movable contact arm 31 lags or drags somewhat behind the heart-shaped cam 43 and remains in electrical contact with the stationary contact 48 in the magneto or running circuit (see Fig. 8). As soon, however, as the sharp point 47 of the heart-shaped cam 43 passes over the sharp edge 46 of the lever 44, the spring 53 acting against the underside of the heart-shaped cam, and by reason of the backlash between the pin 39 and the slot 21, snaps or jumps the lever 36, instantaneously, to the position shown in Fig. 9 bringing the pin 39 against the lower edge of the slot 21. This backlash is sufficient to permit the spring to throw the movable contact arm into engagement with the stationary contact point 49. This movement of the arm 31 is substantially instantaneous. The arm jumps instantly from the contact point 48 in the magneto ignition circuit to the contact point 49 of the battery or starting circuit. So rapid is this movement that there is practically no interruption in the supply of current to the spark plugs. The operator cannot hold the arm 31 between and out of contact with both points 48 and 49. As soon as the sharp edge 47 passes over the edge 46 the spring instantly throws the switch, the flow of current to the spark plugs will be practically continuous and the engine will not stop. The operator may not stop the engine by throwing the switch from the magneto circuit to the battery circuit. Any further movement of the handle 22 and the ring 18 in a clockwise direction from the position shown in Fig. 9 will only result in bringing the parts to the position shown in Fig. 10 with the movable contact point 31 still in engagement with the contact point 49.

And the operator may reverse the above operation without stopping the engine. Thus, with the parts in the position shown in Fig. 10 he may rotate the handle 22 and the ring connected therewith in an anticlockwise direction and the ring will rise to the position shown in Fig. 10 turning the main or operating lever 36 to the position shown in Fig. 11 due to the engagement of the pin 39 with the slot 21. In Fig. 11 the sharp end 47 of the heart-shaped cam 43 is approaching but has not passed over the sharp edge 46 of the lever 44 and the movable contact arm 31 will drag behind the cam and remain in engagement with the battery contact point 49. When, however, the sharp point 47 passes over the sharp edge 46 the spring 53 will immediately throw the parts to the position shown in Fig. 12 on account of the backlash or loose connection between the pin 39 and the slot 31. The spring 53 will thus throw the operating lever 36 in a clockwise direction until the pin 39 engages the top of the slot 31 and this movement will be sufficient to instantaneously move or snap the movable contact point 31 into electrical contact with the magneto contact point 48. This movement is so quick that current to the spark plugs is substantially uninterrupted when the primary current is thus switched from battery to magneto and the engine will continue to run. As above stated, the ring 18 may not be moved any higher than the position shown in Fig. 7 so long as the barrel 7 protrudes into the vertical path of movement of the ring.

To stop his engine, therefore, the operator must turn the key 11, push the barrel 7 inwardly until it seats in one of the recesses 6 of the stationary locking member 5, turning the key, lock the barrel in such position, and withdraw the key. Now the key and the barrel 7 are out of the path of the vertical movement of the controller ring 18, whereupon the operator may now move the handle 22 and the controller ring rigid therewith in an anticlockwise direction from the position shown in Fig. 7 to the position shown in Fig. 13. This movement is not interrupted by the barrel 7. The barrel is out of the way of the vertical plate of the controller ring 18, and the said ring may be moved to its highest position shown in Fig. 13. This movement will carry the movable contact point 31 out of engagement with the contact point 48 to break the circuit. No current being now supplied to the spark plugs, the engine will stop.

After having thus locked the machine and stopped his engine, the operator may start his engine by turning the handle 22 and the controller ring 18 in a clockwise direction and preferably to bring the parts from the position shown in Fig. 13 to that shown in Fig. 10 with the battery circuit closed. He may now start his engine on the battery circuit and the top edge of the controller ring being out of the path of the outward movement of the barrel 7, he may withdraw the barrel 7, thus unlocking the steering wheel.

In order that the top edge of the controller ring 18 may not actually contact against the underside of the barrel 7 while the car is being operated, I preferably provide the ring 18 with a small opening 55 in which is seated a ball 56 spring pressed inwardly by a leaf spring 57, and I preferably provide the cylindrical surface 3' of the cap 3 with a recess 58 into which this ball 56 drops just before the top edge of the ring 18 engages the underside of the barrel 7; that is to say, the ball 56 is in the recess 58 when the parts are in the position shown in Fig. 6. I also provide the cylindrical surface 3' with a second recess 59 into which the ball 56 will fit and lock when the ring is in its highest position (when the car is locked) so that the ring 18 may not be accidentally turned to close either of the ignition circuits. The springs 57 may be provided with a hole 57' therethrough to position the ball with respect thereto.

It is quite necessary that the end of the movable contact arm 31, which is preferably made of resilient material, should bear with substantial pressure on the stationary contact points 48 and 49 to make certain the closure of the circuits. In order that the arm 31 may be easily bent or sprung downwardly to bear with such pressure on the stationary contact points, I provide the block 14 with a hole 60, opposite the position of the arm in circuit breaking condition, (see Fig. 13). In this position the arm 31 may be bent down with a rod or screwdriver into the hole 60 sufficiently to produce the desired tension therein. This construction is useful in making the original adjustment of the tension of the arm, and also for readjustment to compensate for wear of the arm and contact points, and for any slow loss of resiliency in the arm 31.

From the above it will be seen that I have provided a mechanism which will give warning to the operator of an automobile, that he has not locked it, for having once stopped his car the engine will continue to run so long as the car is unlocked. The running of the engine is notice to the operator that he has not locked the car. It will be also observed that I have provided a device in which the ignition circuits may not be broken so long as the car is unlocked even though the lock for locking the steering wheel be one in which the locking barrel may be in different positions with respect to the axis of the steering wheel when the car is locked. Although the locking barrel moves with the steering wheel, the safety device above described will cooperate with the locking barrel or bolt in the manner above described to prevent the interruption of the ignition current so long as the car is unlocked.

I have described a construction wherein there are two ignition circuits, one of which is the magneto circuit and the other of which is the battery circuit. When, however, the ignition circuit of the car is a single circuit, such as a battery circuit, the battery would preferably be attached to the stationary contact point 48 instead of to the stationary contact point 49 and any downward movement of the controller ring beyond substantially the position shown in Fig. 7 might be limited in any suitable manner. The battery wire might, however, be attached to both contact points 48 and 49 to avoid any modification of the structure whatever.

Having thus described my invention, what I claim and desire to protect by Letters Patent of the United States is:

1. In a safety device for an automobile, the combination with a steering wheel, a steering gear column, an electric switch, and a manually movable member mounted on said column for operating said switch to make and break the ignition circuit, of a lock for the steering wheel including a bolt carried by said wheel and extending into the path of movement of said manually movable member whenever said wheel is unlocked to prevent the breaking of said ignition circuit while said wheel is unlocked, and out of the path of the movement of said member when said wheel is locked.

2. In a safety device for an automobile, the combination with a steering wheel, a steering wheel column, a snap switch having a stationary contact in the ignition circuit of said automobile, and a movable contact member cooperating therewith, and a manually movable member mounted on said column for moving said member to a position where it is automatically snapped into and out of electrical engagement with said stationary contact, of a lock for said steering wheel comprising a bolt carried by said wheel and extending into the path of movement of said manually movable member so long as said wheel is unlocked to prevent the breaking of said ignition circuit and out of the path of the movement of said member when said wheel is locked.

3. In a safety device for a lock, the combination of a relatively movable member, a relatively stationary part, an electric switch mounted on said relatively stationary part and having a stationary contact point, and a movable contact point and a manually operable member mounted on said stationary part for moving said movable contact point into and out of engagement with said stationary contact point, of a lock for locking said movable member to said stationary member and comprising a bolt carried by said movable member extending into the path of movement of said manually movable member whenever said lock is unlocked to prevent the breaking of said ignition circuit and out of the path of movement of said manually movable member when said manually movable member is locked to said stationary member.

4. In a safety device for an automobile, the combination with a steering wheel, a steering gear column, and an electric switch having a stationary contact in the ignition circuit of the automobile, a movable contact arm cooperating therewith and a manually movable member mounted in said column for operating said arm, of a lock for the said steering wheel including a bolt carried by and movable with said steering wheel and extending into the path of movement of said manually movable member whenever said wheel is unlocked to prevent the breaking of said ignition circuit and out of the path of movement of said member when said wheel is locked.

5. In a safety device for an automobile, the combination with a steering wheel, a steering gear column, and a switch comprising a stationary contact point connected with the ignition circuit of said automobile and mounted stationarily with respect to said wheel, a movable contact point to make and break said circuit through said stationary point, and a manually movable member carried by said column and arranged to move said movable contact point into and out of contact with said stationary contact point, and locking means carried by said wheel and movable therewith and operative to prevent the movement of said movable member to break said circuit so long as said steering wheel is unlocked.

6. In a safety device for an automobile, the combination with a steering wheel, a steering column, a locking bolt mounted in said wheel and movable therewith, a bolt receiving member rigid with said column, an electric snap switch in the ignition circuit of an automobile stationarily positioned with respect to said column, and manually movable means to operate said snap switch, said bolt extending into the path of movement of said manually movable means to prevent the operation of said switch to break said circuit so long as said wheel is unlocked.

7. In a safety device for an automobile, the combination with a steering wheel, an electric switch having a stationary contact point in the running ignition circuit, a stationary contact point in the starting ignition circuit, a movable contact point movable from one contact point to the other to close the ignition circuit through either stationary contact point and movable to a position in which it is beyond and out of contact with both stationary contact points to break said ignition circuit, and with manually movable means to snap said movable contact point from one stationary contact point to the other and to said position beyond and out of engagement with both of said contact points, of means to prevent said movable contact point from stopping or dwelling between said stationary contact points out of contact with both of said stationary contact points, and means carried by said wheel and movable therewith operative to prevent the manual movement of said movable member a distance sufficient to break the ignition circuit so long as the said steering wheel is unlocked.

8. In a safety device for an automobile, a steering gear column, a steering wheel, a member carried by said wheel and movable therewith and movable to two positions with respect to said wheel, a ring around the top of said column and manually movable up and down on said column, an electric switch operated by said ring to make and break the ignition circuit, said bolt being in one of said positions in the path of movement of said ring, to prevent said ring from being moved to break said circuit when said wheel is unlocked and in the other of said positions out of the path of movement of said ring when said wheel is locked.

9. In a safety device for an automobile, the combination with a steering wheel, a steering column, a lock bolt mounted in said wheel and movable therewith and a bolt receiving member rigid with said column, of an electric snap switch having two stationary contact points in the ignition circuit of the automobile and a movable contact point, and manually operable means for normally automatically throwing said movable contact from said stationary contact points to a circuit breaking position at one side of and not between said stationary contact points, said bolt being operative when out of engagement with said bolt receiving member to limit the movement of said movable contact point to a throw from either of said stationary points to the other.

10. In a safety device for an automobile, the combination with a steering wheel, a steering column and a lock including a lock bolt mounted in said wheel and movable therewith, of an electric snap switch having two stationary contact points in the ignition circuit of the automobile and a movable contact point, and manually operable means for normally automatically throwing said movable contact from said stationary contact points to a circuit breaking position at one side of and not between said stationary contact points, said lock being inoperative when unlocked to limit the movement of said movable contact point to a throw from either of said stationary points to the other.

In testimony whereof, I have hereunto set my hand this 25th day of July, 1924.

FREDERICK HENKE.